United States Patent Office 3,518,426
Patented June 30, 1970

3,518,426
BLAZED DIFFRACTION GRATING X-RAY
SPECTROMETER
Alistair John Campbell, Cambridge, England, assignor to Cambridge Instrument Company Limited, London, England, a British company
Filed Feb. 16, 1968, Ser. No. 705,852
Claims priority, application Great Britain, Feb. 16, 1967, 7,461/67
Int. Cl. G01n 23/20
U.S. Cl. 250—51.5         10 Claims

ABSTRACT OF THE DISCLOSURE

In an X-ray spectrometer employing a blazed diffraction grating optimum conditions are ensured, without making approximations about the sine of an angle being equal to the angle, by supporting a curved blazed gating on a mounting having a pivot defining a pseudo-pole lying on the same Rowland circle as the pole of the grating, the spacing between the two poles subtending at the centre of the Rowland circle an angle equal to twice the blaze angle. The distance from the detector slit to the pseudo-pole is kept equal to the distance between the pseudo-pole and the source as the true grating pole moves linearly towards and away from the source. This distance relationship can be maintained by a cord or tape passing around the pesudo-pole.

---

This invention relates to X-ray spectrometers employing blazed diffraction grating as the dispersing elements instead of the more usual crystals, or instead of plain gratings.

It is known that spectrometers using blazed gratings have a potentially far greater degree of sensitivity than spectrometers using plain unblazed gratings, since a blazed grating can be used in such a manner as to concentrate the greater part of the radiation into a particular non-zero order of diffraction.

The background to the invention and also a preferred embodiment of the invention will be explained with reference to the accompanying drawings, in which.

Figure 1:
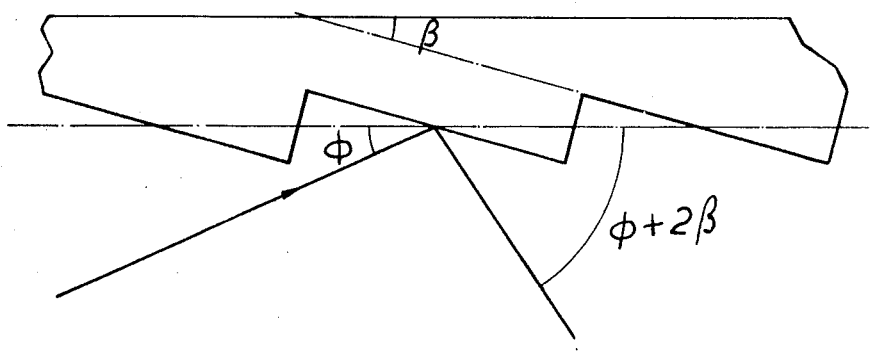
FIG. 1 is a diagram showing the significant angles in a blazed grating.

Referring first to FIG. 1, the angle of incidence of the X-rays from the source striking the grating is $\phi$, with reference to the mean plane of the garting, which in FIG. 1 is a flat grating. The angle of each blazed face with reference to the mean plane, or the blaze angle, is $\beta$. The greatest degree of sensitivity of a blazed grating is achieved when the grazing angle of refraction exceeds the angle of incidence by an amount equal to twice the blaze angle, i.e.: grating angle of refraction $= +2$.

The grating equation then becomes:

$$n\lambda/a = \cos\phi - \cos(\phi + 2\beta)$$
$$= 2\sin(\phi + \beta)\sin\beta$$

where $\lambda$ is the wavelength of the incident rays, $n$ is the order of diffraction and $a$ is the grating spacing.

Figure 2:
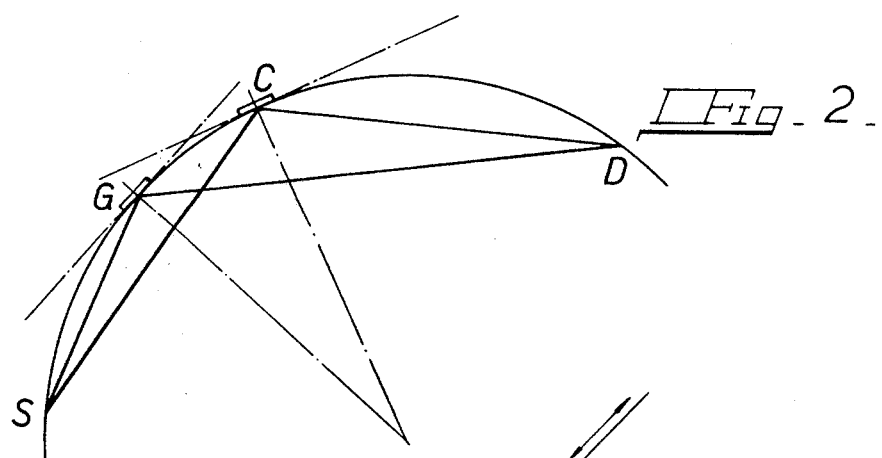
FIG. 2 is a diagram illustrating the so-called Rowland circle.
Figure 3:
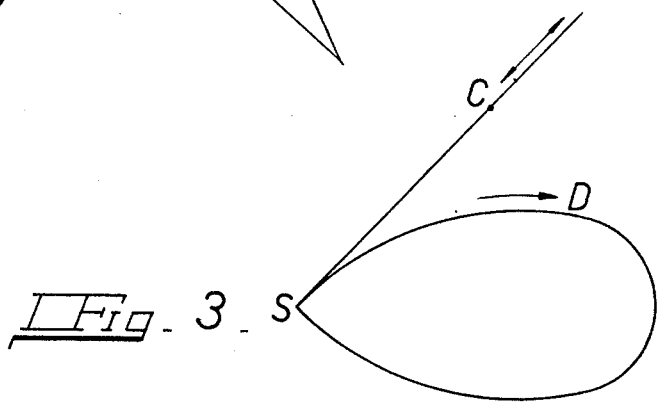
FIG. 3 is a diagram illustrating the path followed by the X-ray detector in a spectrometer of the kind in which the crystal or grating is moved in a linear path towards and away from the source of X-rays.

It is also known that the sensitivity of the spectrometer can be greatly increased by using, instead of a flat grating, a curved or focussing grating, in a manner similar to the use of a curved focussing crystal. As in the case of a crystal it is necessary, for correct focussing, that the source of X-rays, the grating and the means for detecting the selected order of rays should lie on a circle, known as the Rowland circle, and should remain on this circle as the grating or crystal is turned to traverse the spectrum. This is illustrated in FIG. 2 where the source is shown at S, a crystal at C and a detector at D. The diameter of the Rowland circle is equal to the radius of curvature of the crystal. Where a curved blazed grating, shown at G, is used instead of a crystal or a plain grating it still has to lie on the Rowland circle, but because the angle of refraction is not equal to the angle of incidence, the position occupied by the blazed grating is different from that of a crystal for the same detector position.

Where a crystal is used, and where the Rowland circle is fixed in space, there is no problem in providing a linkage, comprising radius arms pivoted at the centre of the circle, that ensures that the crystal and the detector remain lying on the circle as they move around, and gearing ensures that the detector moves round the circle twice as fast as the crystal. In certain apparatus however, it is desirable that the X-ray source (which may for example be a point source excited in a specimen to be analysed, or a collimated beam from a larger source) should remain fixed in space so that it is necessary for the crystal or grating to travel along a path that would, if extended, pass through the source. In the case of a collimated beam, and in the case of a source which cannot rotate and from which only the X-rays coming off at a constant angle are to be analysed, this path will be linear. The crystal turns as it moves towards or away from the source and the Rowland circle is no longer fixed in space, but pivots about the source. The detector D moves in a petal-shaped path of the form shown in FIG. 3, defined in polar coordinates $(r, \theta)$ by the equation: $r = 2R \sin 2\theta$ where the starting line $(\theta = 0)$ is the path of movement of the crystal, and R is the radius of the Rowland circle.

Linkages are known for achieving this result. However, where a blazed grating is used, the position is more complex. The equation above becomes: $r = 2R \sin 2(\theta - \beta)$ and, for any given position of the grating, the detector must be in the position given by: $\theta = \phi + 2\beta$, where, as before, $\phi$ is the angle of incidence at the mid-point or "pole" of the curved grating, and $\beta$ is the blaze angle of the grating.

A mechanism has been proposed for linking the movement of the grating and the detector based on an approximation to the grating equation 1 above as follows: $n\lambda/a = 2\beta(\phi + \beta)$.

This assumes that the sine of an angle is equal to the angle itself, measured in radians, which is only sufficiently true where both the grazing angle of incidence $\phi$ and the blaze angle $\beta$ are small, and even then is not perfect.

The aim of the present invention is to provide a mechanism which makes no such approximations and which is an exact as practical constructional limitations allow.

According to the invention we now propose a mechanism for an X-ray spectrometer by which an X-ray source, the mean point or pole of a concave blazed grating and the entrance slit of a detector are kept in their optimum relative positions on the Rowland circle by a linkage comprising means for guiding the pole of the grating along a path towards and away from the source, the grating being carried on a movable mounting having a pivot which is guided to keep it on the Rowland circle (on which the pole of the grating also lies) the spacing of the pivot from the pole of the grating being such as to subtend at the centre of the Rowland circle an angle equal to twice the blaze angle of the grating, and the movement of the detector being controlled firstly by means for maintaining the distance between the detector slit and the pivot which we may call the "pseudo-pole," equal to the distance between the pseudo-pole and the X-ray source and secondly by a two to one gearing or linkage pivoted at a point on the circumference of the Rowland circle.

The means for controlling the distance between the detector slit and the pseudo-pole may, for example, consist of a cord or tape or equivalent flexible but non-extensible means extending from the detector and around the pseudo-pole to a clamping point on an extension of the line joining the source to the pseudo-pole and at a fixed distance from the source. In a preferred embodiment the pole of the grating and the pseudo-pole both follow linear paths which (if extended) pass through a fixed X-ray source and in this embodiment the clamping point is also fixed in space.

The angular position of the detector may be controlled by a simple two to one gearing or linkage pivoted at the pseudo-pole which maintains the angle subtended at the pseudo-pole by the chord joining the detector slit to the X-ray source equal to twice the angle subtended by the radius vector joining the centre of the Rowland circle to the X-ray source. In an alternative embodiment the two to one gearing or linkage is pivoted at the pole of the grating and is offset so that the angle subtended at the pole by the chord joining the detector slit to the X-ray source is equal to twice the sum of the blaze angle of the grating and the angle subtended at the pole by the radius vector joining the centre of the Rowland circle to the X-ray source. It will be evident to those skilled in the art that the two to one gearing or linkage may be pivoted at any other point on the circumference of the Rowland circle.

The mechanism will include additional guide means, which can be of well known form, for keeping the grating facing towards the centre of the Rowland circle and for keeping the detector facing towards the grating.

An additional advantage of the mechanism proposed is that no point or other mechanism is mounted at the centre of the Rowland circle. Thus this centre is a purely imaginary point in space. In the case where the radius of curvature of the grating is large and the range of incidence angles is small the space occupied by the mechanism is much smaller than that which would be occupied by a mechanism with the pivot at the centre of the Rowland circle. When the mechanism is mounted in a vacuum chamber, the centre of the Rowland circle may lie outside the vacuum chamber at some or all positions of the mechanism.

Figure 4:
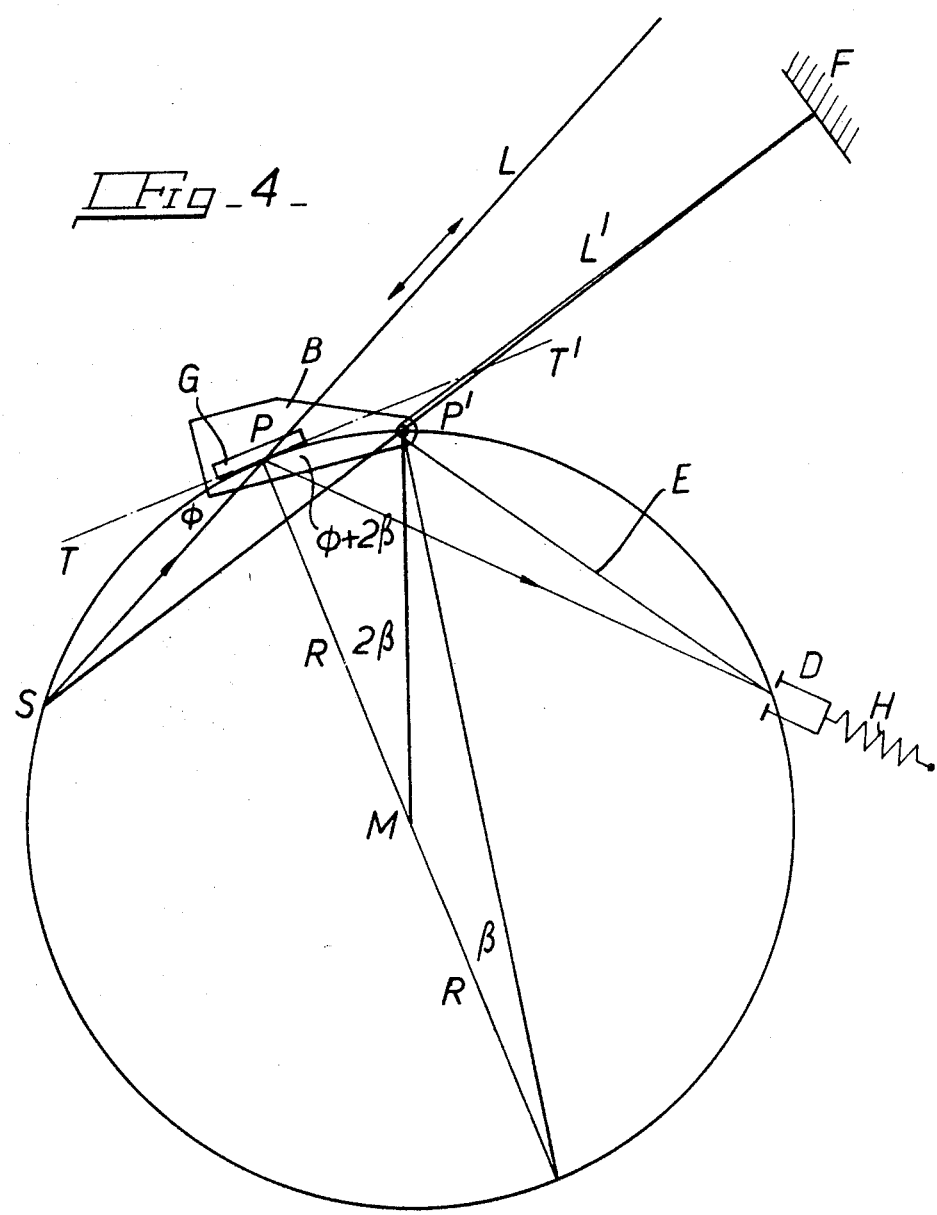
FIG. 4 illustrates a preferred embodiment of the layout according to the invention.

The invention will now be further described by way of example with reference to FIG. 4 of the accompanying drawings.

The source of X-rays is shown at S. It may for example be a point on a specimen to be analyzed, excited by the impact of a finely focussed beam or so-called "probe" of electrons, or it could be a collimated beam for a more diffuse source. A blazed grating G having a blaze angle is guided along a linear path L towards and away from the source, so that it is always receiving the X-rays emanating in a constant direction from the source. The grating is curved to a radius 2R, so that the radius of the Rowland circle is R, and as the grating moves along the line L it is turned by a suitable linkage in a known manner so that it always faces the centre M of the Rowland circle, that is to say, the tangent at the midpoint or "pole" of the grating remains perpendicular to a radius through that pole. The Rowland circle (which is not physically present but is simply a geometrical conception) swings about the source S.

The linkage that keeps the grating facing towards the centre of the circle may be of a known kind involving a sine bar that keeps the angle of incidence $\phi$ such that $2R \sin \phi$ is equal to the distance of the pole P from the source S.

The detector D, or rather its entrance slit, must also be kept on the Rowland circle. This is done first by controlling its distance away from the pseudo-pole and secondly by controlling its angular position in relation to a point on the circumference of the Rowland circle.

We control the angular position by mounting the detector slit on the free end of an arm pivoted at, for example, the pseudo-pole P' and connected to the grating mounting through a two to one gearing or through a hrombus linkage, so that angle SP'D is always equal to twice angle SP'M. Such a linkage is well known in crystal spectrometers in which the angle of deviation LPD is equal to twice the grazing angle of incidence.

In an alternative embodiment the angular position of the detector slit is controlled by mounting it on the free end of an arm pivoted at the pole of the grating and connected by a similar gearing or linkage to the grating mounting. In this case, the gearing or linkage must be offset so that the angle of deviation LPD is equal to twice the sum of the grazing angle of incidence and the blaze angle of the grating.

We control the distance of the detector D from the pseudo-pole P' as follows: the grating mounted on a support B that carries a pivot point P', which we call the pseudo-pole. The grating is fixed to the support so that, as the grating turns the support turns with it and the pseudo-pole P' remains on the Rowland circle. The distance PP' is made such as to subtend an angle $2\beta$ at the centre M of the Rowland circle, or $2\beta$ at its circumference. It will be observed that P' is thus the point that would be occupied by a crystal if a crystal were being used instead of a blazed grating, in that the tangent at P' makes equal angles with the lines SP' and DP'. The detector D is arranged to slide towards and away from the grating G on its mounting arm and is caused always to face the pole P of the grating in a known manner. A tape or cord E of thin flexible but inextensible material, for example of metal strip, extends from the detector D, around a pulley or pin at the pseudo-pole P' and along a line L', which is the path of the pseudo-pole, to an anchorage point F on that line. A tension spring or equivalent means, indicated diagrammatically at H, keeps the tape taut. As the support B moves towards and away from the source S the tape moves the detector D along its mounting arm so as to keep the relationship between the distances SP and PD such as to keep the detector D on the Rowland circle. It will be noted that these distances are not equal.

Thus, by the use of a pseudo-pole as a reference point we are able to keep the relationships between the X-ray source, the blazed grating and the detector slit exactly correct for optimum conditions, without making any approximations and without having to rely on the blaze angle and the grazing angle of incidence being small.

I claim:

1. An X-ray spectrometer mechanism by which an X-ray source, the mean point (pole) of a concave blazed diffraction grating and the entrance slit of a detector are kept in their optimum relative positions on the Rowland circle such as to satisfy the relationship:

$$n\lambda = 2a \sin (\phi+\beta) \sin \beta$$

where:

$\lambda$ is the wavelength of the incident rays
$a$ is the grating spacing
$n$ is the order of diffraction
$\phi$ is the grazing angle of incidence
$\beta$ is the blaze angle, said mechanism comprising means defining the X-ray source means guiding said grating pole in a path towards and away from said source, a mounting for said grating, said mounting defining a pivot in the form of a pseudo-pole, means constraining said pivot to lie on the Rowland circle, the spacing between said pole and said pseudo-pole subtending an angle at the centre of the Rowland circle equal to twice the blaze angle, means pivoted at a point on the Rowland circle and guiding the detector entrance slit, said guiding means acting to maintain the angle subtended at said point by a line joining said source to said detector entrance slit equal to double the angle subtended at said point by a line joining said source to the centre of the Rowland circle, and means maintaining the distance of said detector entrance slit from said pseudo-pole equal to the distance of said pseudo-pole from said source.

2. The mechanism set forth in claim 1 wherein said point is said pseudo-pole.

3. The mechanism set forth in claim 1 wherein said point is said pole.

4. The mechanism set forth in claim 1 wherein said distance-maintaining means comprise a flexible but non-extensible member under tension and extending from said detector entrance slit and around said pseudo-pole and to a clamping point on an extension of a line from said source passing through said pseudo-pole.

5. The mechanism set forth in claim 4 wherein the means defining said X-ray source are fixed in space, the said path of said grating pole and the path of said pseudo-pole lie on respective straight lines passing through said X-ray source, and said clamping point is fixed in space and lies on said second-mentioned straight line.

6. The mechanism set forth in claim 1 wherein said means defining the X-ray source are fixed in space.

7. The mechanism set forth in claim 6 wherein said path of said grating pole and also the path of said pseudo-pole lie on respective straight lines passing through said X-ray source.

8. The mechanism set forth in claim 1 wherein the means defining the X-ray source comprise a point in a specimen excited by a focussed electron beam.

9. The mechanism set forth in claim 1 wherein the means defining the X-ray source comprise a slit illuminated by an X-ray beam from a diffuse source.

10. The mechanism set forth in claim 1 wherein said mechanism is mounted in an evacuated chamber and the centre of said Rowsand circle lies outside said chamber.

References Cited

UNITED STATES PATENTS 3,384,756  5/1968  Hasler et al. _____ 250—51.5

WALTER STOLWEIN Primary Examiner

A. L. BIRCH, Assistant Examiner

U.S. Cl. X.R.
356—79